UNITED STATES PATENT OFFICE.

LEO H. BAEKELAND, OF YONKERS, NEW YORK.

CONDENSATION PRODUCT OF PHENOL AND FORMALDEHYDE AND METHOD OF MAKING THE SAME.

942,700.	Specification of Letters Patent.	Patented Dec. 7, 1909.

No Drawing.	Application filed December 4, 1907. Serial No. 405,021.

*To all whom it may concern:*

Be it known that I, LEO H. BAEKELAND, a citizen of the United States, residing at Yonkers, in the county of Westchester and State of New York, have invented certain new and useful Improvements in Condensation Products of Phenols and Formaldehyde and Methods of Making the Same, of which the following is a specification.

It is well known that phenol or its homologues and formaldehyde or its polymers are capable of reacting to yield a condensation product, and in my copending application, Ser. No. 383,684, filed July 13, 1907, I have described a method of producing a hard, infusible and insoluble product by reacting on a phenolic body with formaldehyde under conditions which yield an oily or viscous condensation product, and thereafter transforming this initial condensation product by application of heat and pressure into infusible and insoluble products or articles having any desired configuration, such products or articles consisting solely of the condensation product or of the same in admixture with other bodies.

The present invention relates to an improved method of preparing the above mentioned infusible and insoluble material, or articles consisting of or containing the same, and to a novel intermediate reaction product of phenol and formaldehyde, the object of the invention being to facilitate and simplify the manufacture of such articles.

In order that the invention may be clearly understood the mode of carrying the reaction into effect and the characteristics of the several condensation products which may be obtained will be fully described.

If a mixture of phenol or its homologues and formaldehyde or polymers be heated, alone or in presence of catalytic or condensing agents, the formaldehyde being present in about the molecular proportion required for reaction, that is to say, approximately equal volumes of commercial phenol or cresylic acid and commercial formaldehyde, these bodies react upon each other and yield a product consisting of two liquids which will separate or stratify on standing. The supernatant liquid is an aqueous solution which contains the water resulting from the reaction or added with the reagents, whereas the heavier liquid is oily or viscous in character and contains the initial products of chemical condensation. The liquids are readily separated, and the aqueous solution may be rejected, or the water may be eliminated by evaporation. The oily or viscous liquid obtained as above described, and hereinafter referred to as the "initial condensation product," is found to be soluble in or miscible with alcohol, acetone, phenol, and other solvents, but is only partially and imperfectly soluble in benzol. This initial product sometimes assumes a pasty or half-solid state when cooled to a sufficient extent, or may even assume a solid and brittle state, but is again liquefied when heated, and this alternate solidification and liquefaction may be repeated so long as the product does not become transformed into the intermediate or into the final condensation products hereinafter described.

If the initial condensation product be heated in an open vessel at temperatures above 100° C., the mass will foam, emit vapors, and yield a hard, irregular and porous body, infusible by further heating and insoluble in alcohol, acetone and phenol. In order to avoid the production of a porous mass it has been proposed to harden the initial condensation product at temperatures below 100°, but such hardening is extremely slow and applicable only to relatively thin layers of material. In closed vessels or molds in which pressure may be used to counteract the tendency of the mass to liberate gases or vapors, as described in my application above referred to, the hardening may be accomplished much more quickly and is more complete, the final product being homogeneous or free from all porosity, insoluble in alcohol, acetone, benzol, phenol or glycerin, and less elastic than hard rubber but much harder and considerably more resistant to heat, remaining solid at all temperatures below 300° C. The product thus obtained is hereinafter referred to as the "final condensation product."

In my copending application above referred to I have described a method whereby the initial condensation product is directly transformed into the final condensation product. Such method has two limitations, viz: (1) each block or article undergoing hardening requires a separate mold or vessel during the full period of the hardening process: and (2) the final condensation product is a bad conductor of heat and contracts in volume while hardening. Therefore it becomes difficult if not impossible to heat large bodies of the material rapidly and uniformly. Rapid heating under such conditions will harden the outside layers before the heat can penetrate to the interior portions which remain soft, and the hardened outside layers will then contract upon the interior portions, this action producing cracks or fissures in the article.

I have now discovered that under proper conditions there may be produced a condensation product which is intermediate in character between the initial and final products above described, and which is hereinafter referred to as the "intermediate condensation product." This intermediate product is solid at all temperatures, more or less hard when cold, but elastic when slightly heated and capable at normal or higher temperatures of yielding to pressure but resuming its original shape if pressure be discontinued; further application of heat will soften it to a considerable extent but will not convert it again into a liquid. The product is insoluble in alcohol, glycerin, formaline, or a mixture of the two latter products, but swells in phenol and in acetone without complete solution. According to the present method I utilize the properties of this intermediate condensation product, and carry out the hardening process in two or more successive stages, which may be conducted if desired independently and at different times. In the first stage heat is applied for sufficient time only to convert the original mixture into the intermediate condensation product, which may be taken from the molds or vessels in which it has been produced and kept for future use; or this intermediate product can be cut, pressed or shaped to any desired form or size, or introduced into new molds, or welded or pressed together, or otherwise worked, being finally submitted to the hardening process which will transform it into the hard, insoluble and infusible final condensation product. The manner of treatment may be widely varied in accordance with the character or size of the article to be produced, and the special properties of the intermediate condensation product are found to greatly enlarge the field of application of these products and to permit the manufacturing methods to be varied to conform to the characteristics of the article desired.

Certain methods of procedure adapted for the production of blocks or special objects or articles are detailed below:

Example 1: The mixture of phenol or its homologues and formaldehyde or its polymers with or without condensing agents or extraneous materials such as pigments, dyes, granular or fibrous filling materials, etc., is heated in a suitable vessel, preferably at a temperature of about 100° C. An oily or viscous condensation product separates, which on continued heating solidifies into a stiff elastic intermediate condensation product. The earlier stages of this reaction may be carried out if desired without pressure, and in such case a return condenser is required; but it is found preferable to keep the mass under pressure more particularly toward the end of the operation so as to avoid porosity or swelling of the intermediate product. This intermediate product is now stored away for future use, or is cut, pressed or worked into any desired shape or size, and is then submitted to the final hardening by the application of a higher temperature or longer heating. For instance slabs, cylinders, or any other desired shapes may be cut from the original block of intermediate condensation product, and the articles so produced may be placed in a suitable vessel where pressure is applied during the heating process and the articles are thus heated and hardened, retaining their shape without the use of molds. Or again, these slabs, cylinders or the like prepared from the intermediate condensation product may during the final hardening be pressed into molds, or submitted to any pressure or action intended to modify their configuration, the hardened articles after transformation into the final state being found to permanently retain the form imparted to them during the hardening process. For very small or thin objects it is not absolutely necessary to carry out the final hardening process under pressure, and hardening may then be produced by slow heating or drying; in such case the hardening process is necessarily much slower and may require several days for its completion. If open air drying is resorted to it frequently occurs that surface oxidation sets in imparting a dark color to the hardened object. In order to prevent this, the articles may be dried or heated *in vacuo* or in inert gaseous media. Or the hardening may be carried out under water, hydrocarbon liquids, or other suitable liquids maintained at the proper hardening temperature. Or if the hardening is to be carried out at temperatures higher than 100° C., the air or inert gas or liquid is maintained under such pressure as will avoid the formation of a porous mass.

Example 2: The mixture of phenol or its homologues and formaldehyde or its polymers is treated alone or in presence of condensing or dehydrating agents or extraneous materials until the oily or viscous initial condensation product separates. The aqueous layer is removed and may be rejected or concentrated to reclaim any soluble materials, or the water may be merely expelled by submitting the two liquids to evaporation by further heating. If the aqueous liquid be rejected then the oily liquid may be further evaporated to expel residual water and volatile products. In order to avoid thickening or hardening of the liquid during this stage it is preferred to carry out this treatment under reduced pressure or vacuum, which allows considerably greater latitude in the operation and greatly facilitates it because evaporation or drying is thus carried out at temperatures below that at which hardening sets in. The elimination of water or volatile products from the oily or viscous initial condensation product is not always necessary, but is advantageous in special cases as for instance in the manufacture of electric insulating materials. The initial condensation product, however prepared, is introduced into a suitable vessel or mold and gently heated until the liquid or viscous mass approaches the solid condition of the intermediate condensation product. During this stage of the process the liquid mass is preferably stirred, in order to maintain a uniform temperature throughout the liquid, and toward the latter part of the period which precedes solidification the external heating may be discontinued, while solidification goes on as soon as the proper temperature has been reached. By proceeding in this manner it is possible to produce large blocks of the intermediate condensation product of homogeneous texture and without gas bubbles or porosity. The intermediate condensation product may now be stored away for future treatment, or may be immediately treated as described in Example 1. The method as described in Example 2 may be used to good advantage for covering wood, metal, paper or any desired surface with thin hard layers of the final condensation product. To effect this the object to be covered is first coated with the initial condensation product by dipping, brushing or the like. The layer so produced is slowly heated or dried until the condition of the intermediate condensation product is reached, after which the final hardening is effected by heating under pressure, either in a gaseous or liquid medium. This cycle of operations can be repeated to form in succession several thin layers of the final condensation product, thereby building up a compound layer of considerable thickness without danger of splitting or cracking to which thick layers are liable, and avoiding also any tendency to porosity in case the hardening is conducted at higher temperatures.

Example 3. The initial condensation product, either alone or admixed with extraneous materials is introduced into a suitable vessel and heated under pressure until the intermediate state is attained. This permits the employment of higher temperatures and greatly shortens the time required for the production of the intermediate product. After such intermediate product is obtained the solidified block or object is further treated as described in Examples 1 and 2.

Example 4. The initial product alone or mixed with extraneous materials is placed in suitable molds, and the latter are gently heated until the intermediate condensation product is formed. This is now removed from the mold and subjected to the final hardening by heating at a higher temperature under suitably increased pressure, as described under Examples 1 and 2.

Example 5. The initial condensation product, alone or mixed with extraneous materials is heated under pressure in suitable molds until the intermediate product is obtained. The latter is removed from the molds and is hardened to the final product by slow drying or heating at low temperatures in the open air or in an inert gaseous or liquid medium. This method is advantageous as applied to the manufacture of small or thin objects.

Example 6. The initial product alone or mixed with extraneous materials is heated in molds under pressure until the intermediate product is obtained. This is then removed from the molds and further heated under pressure without molds as described in Examples 1 and 2. This permits a general shortening of the process, more particularly for bulky objects, and reduces the number of molds required by using them only during the first stage of the process.

The term phenol employed in the claims is to be understood as including the homologues of phenol, such as cresol, and the term formaldehyde is to be understood as including the polymers of formaldehyde.

I claim:

1. A condensation product resulting from the reaction of a phenolic body and formaldehyde, said condensation product being solid at all temperatures, hard when cold, soft and elastic when heated but infusible, and insoluble in alcohol, glycerin, formaldehyde or mixtures of these, but swelling in phenol and acetone without complete solution therein.

2. The method of making a condensation product of a phenolic body and formaldehyde, which consists in reacting on a phenolic body with formaldehyde, and arresting the reaction when the initial condensation product has been transformed into a mass which is solid at all temperatures and hard when cold, soft and elastic when heated but infusible, insoluble in alcohol, glycerin and formaldehyde or mixtures of these, and which swells in phenol and acetone without complete solution therein.

3. The method of making a condensation product of a phenolic body and formaldehyde, which consists in reacting on a phenolic body with formaldehyde, separating water from the initial condensation product, and arresting the reaction when the initial condensation product has been transformed into a mass which is solid at all temperatures and hard when cold, soft and elastic when heated but infusible, insoluble in alcohol, glycerin and formaldehyde or mixtures of these, and which swells in phenol and acetone without complete solution therein.

4. The method of making a shaped condensation product of a phenolic body and formaldehyde, which consists in reacting on a phenolic body with formaldehyde, arresting the reaction when the product has become infusible and insoluble but is yet capable of softening under the influence of heat, and shaping and hardening said product.

5. The method of making a shaped condensation product of a phenolic body and formaldehyde, which consists in reacting on a phenolic body with formaldehyde, arresting the reaction when the product has become infusible and insoluble but is yet capable of softening under the influence of heat, shaping said product and hardening the same by adequate application of heat.

6. The method of making a shaped condensation product of a phenolic body and formaldehyde, which consists in reacting on a phenolic body with formaldehyde, arresting the reaction when the product has become infusible and insoluble but is yet capable of softening under the influence of heat, shaping said product and hardening the same by adequate application of heat and pressure.

7. The method of making a shaped condensation product of a phenolic body and formaldehyde, which consists in reacting on a phenolic body with formaldehyde, arresting the reaction when the product has become infusible and insoluble but is yet capable of softening under the influence of heat, and shaping and hardening said product compounded with a suitable filling material.

In testimony whereof, I affix my signature in presence of two witnesses.

LEO H. BAEKELAND.

Witnesses:
H. S. TARBELL,
MARY E. SCHOLDING.